US008949329B2

(12) United States Patent
Varvello et al.

(10) Patent No.: US 8,949,329 B2
(45) Date of Patent: Feb. 3, 2015

(54) CONTENT POPULARITY EXTRACTION IN DISTRIBUTED HASH TABLE BASED PEER-TO-PEER NETWORKS

(75) Inventors: Matteo Varvello, Port Monmouth, NJ (US); Moritz Steiner, Montclair, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 158 days.

(21) Appl. No.: 13/188,705

(22) Filed: Jul. 22, 2011

(65) Prior Publication Data

US 2013/0024510 A1   Jan. 24, 2013

(51) Int. Cl.
G06F 15/16 (2006.01)
G06F 15/173 (2006.01)
H04L 29/08 (2006.01)

(52) U.S. Cl.
CPC ............ H04L 67/1065 (2013.01); H04L 67/22 (2013.01); H04L 67/1093 (2013.01)
USPC .......................................... 709/204; 709/223

(58) Field of Classification Search
CPC ....... H04L 67/104; H04L 67/22; H04L 67/10; H04L 45/02
USPC ....................................................... 709/223
See application file for complete search history.

(56) References Cited

U.S. PATENT DOCUMENTS 7,174,382 B2 * 2/2007 Ramanathan et al. ........ 709/227
7,313,565 B2 * 12/2007 Zhang et al. .................... 1/1
7,516,232 B2 * 4/2009 Barrett et al. ................. 709/231
8,189,489 B2 * 5/2012 Zhang et al. .................. 370/248
2012/0221647 A1 * 8/2012 Ciminiera et al. ............ 709/204

FOREIGN PATENT DOCUMENTS

GB          2376326 A     12/2002

OTHER PUBLICATIONS

Taoufik et al . "Exploiting KAD: Possible Uses and Misuses" p. 1-4, 2007.*
Xiaoqiu Shi et al. "Popularity Adaptive Search in Hybrid P2P Systems" 2007.*
Jacob et al . "To Cache or Not to Cache—That Is the Question; P2P "Systemcaching"—The Copyright Dilemma" -31 Whittier L. Rev. 421 (2010).*
M. Steiner and E.W. Biersack, "Where Is My Peer? Evaluation of the Vivaldi Network Coordinate System in Azureus" pp. 145-156.
Dabek, Frank et al., "Vivaldi: A Decentralized Network Coordinate System", SIGCOMM'04, Aug. 30-Sep. 3, 2004, Portland, Oregon, USA.
Steiner, Moritz et al., "Exploiting KAD: Possible Uses and Misuses", CCR.
Maymounkov, Petar and Mazieres, David, "Kademlia: A Peer-to-peer Information System Based on the XOR Metric" pp. 1-6. CCR.

(Continued)

Primary Examiner — Joshua Joo
Assistant Examiner — Younes Naji
(74) Attorney, Agent, or Firm — Harness, Dickey & Pierce

(57) ABSTRACT

Provided is a method for content popularity extraction from a distributed hash table (DHT). The method includes receiving, by a first node, a request message from a second node of a peer-to-peer network. Accessing, by the first node, information associated with the request message, the information indicating a content item and a content demand. And determining, by the first node, a content popularity of a plurality of content items based on the information.

10 Claims, 9 Drawing Sheets

(56) References Cited

OTHER PUBLICATIONS

Xiaoqiu Shi et al.: "Popularity Adaptive Search in Hybrid P2P Systems", Parallel and Distributed Processing Symposium, 2007. IPDPS 2007. IEEE International, IEEE, PI, Mar. 1, 2007, pp. 1-10.

M. Zaharia et al.: "Gossip-based search selection in hybrid peer-to-peer networks", Concurrency and Computation: Practice and Experience, vol. 20, No. 2, Feb. 1, 2008, pp. 139-153.

International Search Report for corresponding International Application No. PCT/US2012/045194.

* cited by examiner

Related Art

CONTENT POPULARITY EXTRACTION IN DISTRIBUTED HASH TABLE BASED PEER-TO-PEER NETWORKS

BACKGROUND OF THE INVENTION

Embodiments relate to peer-to-peer file sharing networks and a method for content popularity extraction from a distributed hash table (DHT).

DESCRIPTION OF THE RELATED ART

Some versions of peer-to-peer file sharing networks rely on a centralized computer or network of network elements to list all of the available content in the network. Other peer-to-peer file sharing networks do not rely on centralized components to list all of the available content on a network. Rather, the directory is distributed as the content itself is distributed. The technique used to distribute the directory database on all participating clients is sometimes referred to as a distributed hash table (DHT).

Whether the network is a centralized type network or a network using a DHT, peers download content from one peer to another without regard to the locality of a peer from which content is shared. As a result, if a peer requests a file contained on another peers' computer, the computer containing the file may be located far away from the peer requesting the file. This results not only in file transfer delays, but increased cost as the link between the peers must go through one or more internet service providers (ISPs). Thus, such peer-to-peer type of connections can create a large amount of traffic on transit links linking ISPs together, thereby increasing costs to network operators.

For example, assume there is a popular content file and that there are 10,000 users world-wide that have this file on their computers. Assume 50 of those 10,000 users may be located within a given ISP "A". Assume a peer within ISP "A" is interested in the popular file and requests the directory, either the centralized or DHT type directory for 50 random peers from which to download the file. In such an instance there is a chance of 0.5% of finding a single peer within ISP "A." There is a chance close to zero that if 50 peers having the file are randomly identified to the requesting peer, that all 50 peers will be inside ISP "A."

In such a scenario, while there are an ample number of peers within the same ISP as the peer requesting the file, the chances are that the peer will end up receiving the file from a peer located outside the requesting peers' ISP. This requires unnecessary traffic on a transit link between ISPs.

FIG. 1 shows a schematic diagram of centralized peer-to-peer system 10. The centralized peer-to-peer system 10 includes computers 12 which are also referred to as peers and/or nodes 12 and a central computer 14. The peers and/or nodes 12 are connected to the central computer 14 via connections 16. The connections 16 may be any suitable connection such as wireless connection, Ethernet connection or combination of any suitable connection hardware or methods.

While the peer-to-peer system 10 shows only four peers and/or nodes 12 and a single central computer 14, it is to be understood that a peer-to-peer system is not limited to the number of peers and/or nodes 12 shown and central network component of a single central computer 14. In fact, the peer-to-peer system 10 may include many more peers and/or nodes 12 and many computers, servers or other components may accomplish the tasks of the central computer 14 shown.

In a centralized peer-to-peer system 10 as shown in FIG. 1, when a peer and/or node 12 requests content or a file, the request is sent via the connection 16 to the centralized computer 14. Sending requests are well known in peer-to-peer networks.

The centralized computer 14 determines what peers and/or nodes 12 have the requested content and may respond to the request with information regarding what peers and/or nodes 12 have the requested content. The centralized computer 14 may identify several peers and/or nodes 12 having the requested content and respond with information regarding multiple identified peers and/or nodes 12. Once a peer and/or node 12 or peers and/or nodes 12 is/are indentified, the requesting peer may then receive the requested file from one of the identified peers.

The centralized computer 14 may make a determination of which peers and/or nodes 12 among many peers and/or nodes 12 that may contain the requested content that should be identified to the requesting peer in order to reduce large amounts of data being transmitted over transit links. These decisions may be made to localize peer-to-peer traffic. This determination will be described in more detail later below.

For example, one well known file sharing system for peer-to-peer networks is known as BITTORRENT™, registered to BitTorrent Inc. The mechanisms the BITTORRENT file sharing system uses to discover peers impact the structure of the P2P network and consequently the data dissemination. Thus, the knowledge of the peer discovery in the BITTORRENT file sharing system is fundamental for a clear understanding of traffic localization. The BITTORRENT file sharing system employs a tracker or central server (e.g., centralized computer 14) in order to discover peers and coordinate file exchanges. Peers retrieve the address of the tracker within a torrent they download from the web. A ".torrent" is a meta data file that contains useful information for the file exchange.

Initially, a peer contacts the tracker to retrieve a list of peers that hold the file or a portion of it. The tracker answers with the peer-list, a random subset of active peers generally composed by 50 peers. Afterwards, a peer interacts with the tracker regularly in order to send information about the volume of bytes the peer has downloaded or uploaded. In response, the tracker sends to the peer a new peer-list. The frequency of communications between the client and the tracker is regulated by the tracker via a min interval field contained in the tracker replies. Generally, it is set to 15 minutes.

As indicated above, the peer-list is a random subset of active peers. The peer-list in no way includes localization of peers within a network (e.g., an internet service provider network (ISP) network). Some efforts have been made to leverage the tracker or central server (e.g., centralized computer 14) for localization. However, these efforts are outside the scope of this disclosure.

SUMMARY OF THE INVENTION

One embodiment includes a method for determining content popularity in a peer-to-peer network. The method includes receiving, by a first node, a request message from a second node of a peer-to-peer network. Accessing, by the first node, information associated with the request message, the information indicating a content item and a content demand. And determining, by the first node, a content popularity of a plurality of content items based on the information.

Another embodiment includes a node. The node includes a memory configured to store a table, the table including a plurality of keys and node information, the node information being stored in relation to each of the plurality of keys. The node includes a processor configured to receive a request message from a second node of the peer-to-peer network based on an address associated with one of the plurality of keys, the processor is configured to access information associated with the request message, the information indicating a content demand, and the processor is configured to determining a content popularity of a plurality of content items based on the information.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
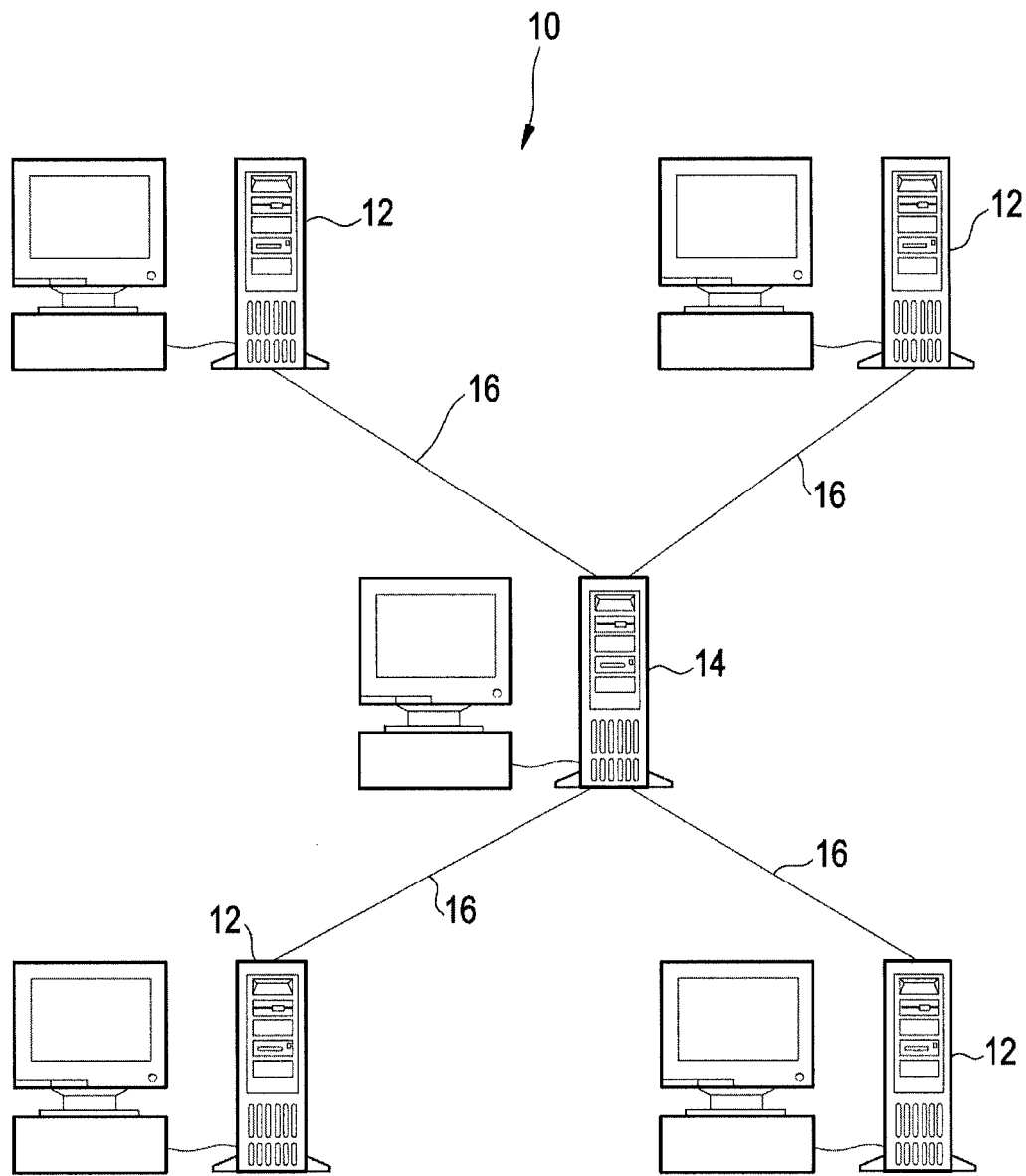
FIG. 1 illustrates a related art schematic diagram of a peer-to-peer file sharing network having centralized components.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and will be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

The terms "peer" and "node" are used interchangeably throughout this disclosure. Generally, a peer refers to the physical hardware within the peer-to-peer network. A peer may also be a node. However, a node may also more generally refer to a logical instance of, for example a file location (e.g., address or reference in a table) within the peer-to-network.

Figure 2:
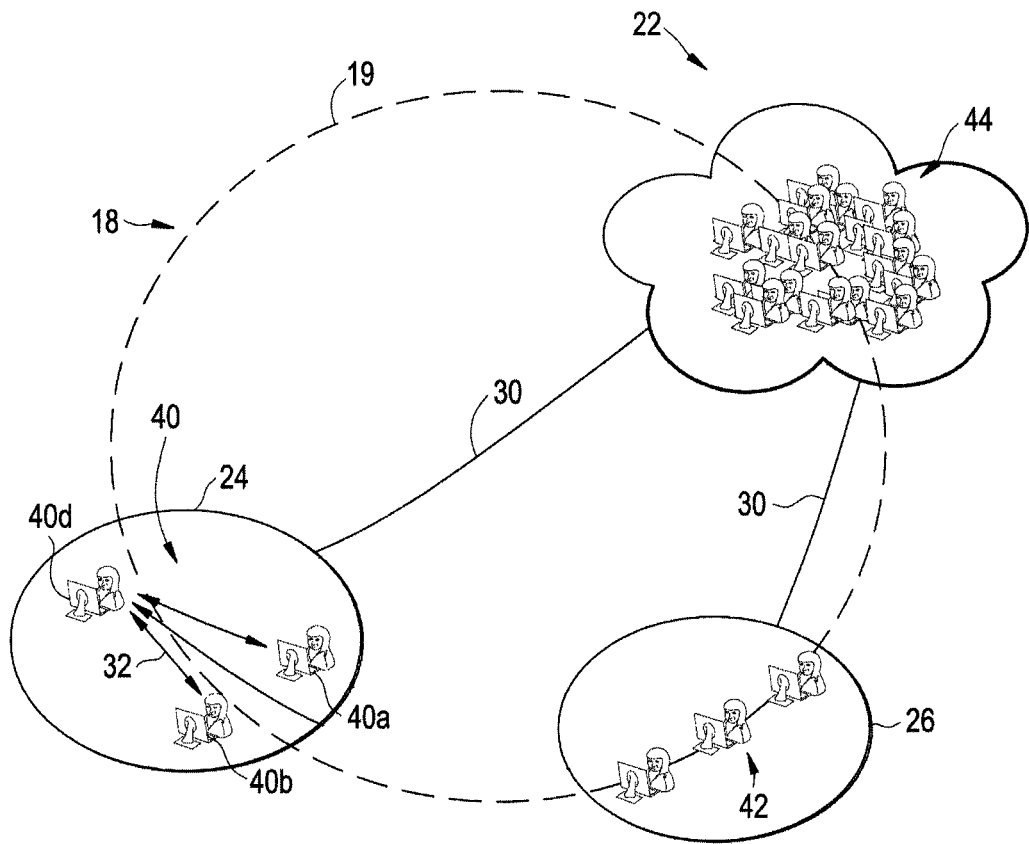
FIG. 2 illustrates a schematic diagram of a peer-to-peer file sharing network utilizing a distributed hash table (DHT) in accordance with example embodiments.

FIG. 2 is a schematic diagram of a peer-to-peer network 18 in accordance with an example embodiment. In the peer-to-peer network 18 shown in FIG. 2, there is no central computer 14. While not shown, it should be understood that peers 40, are connected by connections to each other.

FIG. 2 shows a peer-to-peer file sharing network 18. The network 18 of FIG. 2 does not rely on centralized components to list the network contents, but rather uses a distributed hash table (DHT) 19 to distribute the directory database to all participating clients. The DHT 19 is represented in FIG. 2 as a broken line connecting all aspects of the network 18 together.

The file sharing network 18 includes a first Internet service provider (ISP) 24 and a second ISP 26. Within the ISP 24 are various clients, which may also be referred to as peers, nodes or users 40. The various clients, peers or users will be distinguished from amongst other peers on the same ISP by adding a letter behind the reference numeral.

A second ISP 26 is also shown having various peers 42. The first ISP 24 and the second ISP 26 may be connected together via a peering link 28.

The internet at large 22 is illustrated in FIG. 2. ISP 24 may be connected to the Internet at large 22 by a transit link 30. A transit link 30 may also connect ISP 26 to the Internet at large 22. Peers located on the internet at large 22 are identified by reference number 44. Like the peers 40 and 42, the peers 44 on the Internet at large 22 are associated with at least one ISP. However the ISP's associated with the peers 44 on the internet at large 22 are not shown. Arrows 32 illustrate file sharing where the peers 40a, 40b, and 40d share files between each other.

Figure 3:
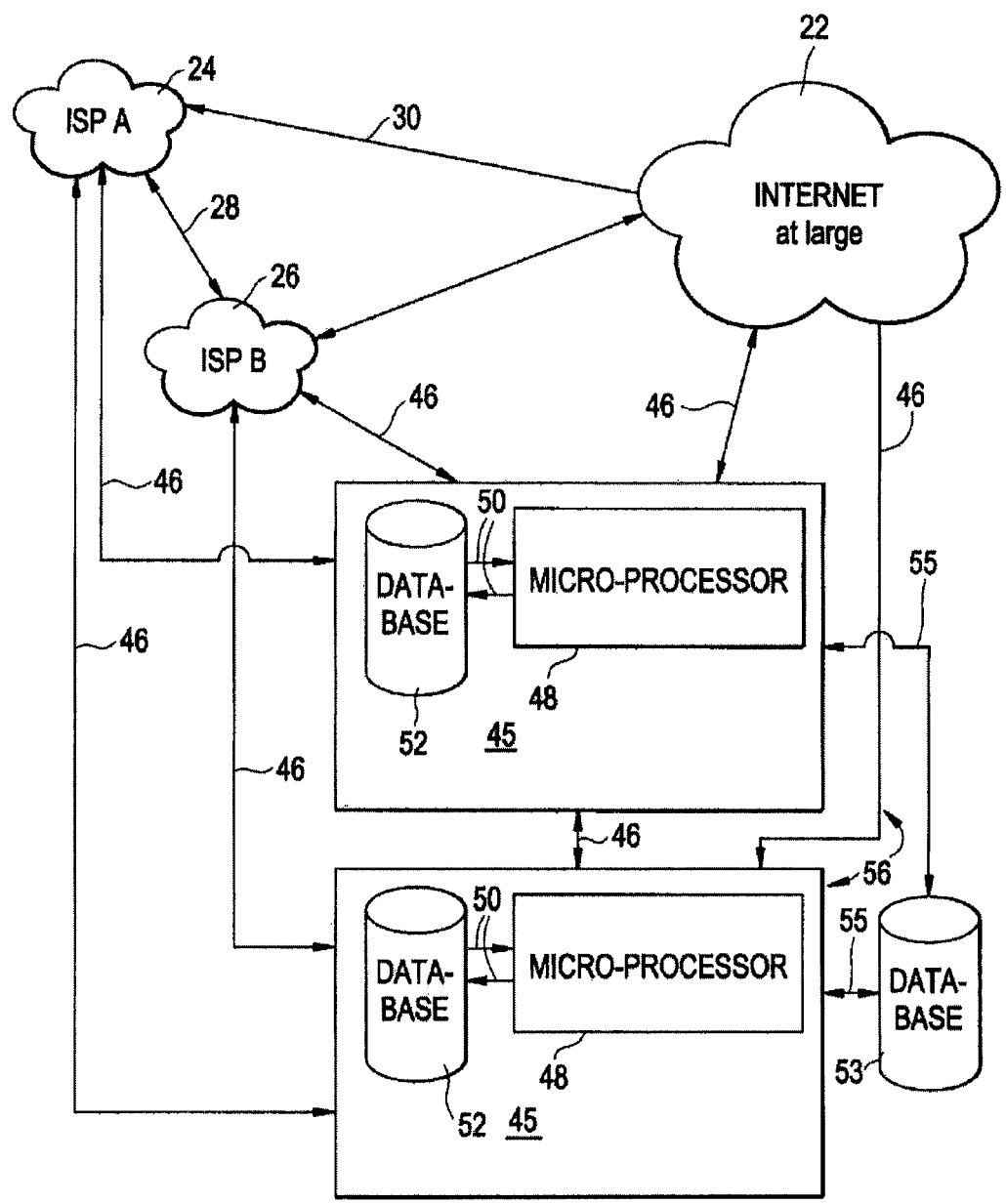
FIG. 3 illustrates a schematic diagram of a file sharing network in accordance with example embodiments and illustrates various components of a computer in communication with the file sharing network.

FIG. 3 is a schematic diagram illustrating various ISPs 24, 26, the Internet at large 22, and network components (which may also be referred to as computers, or network elements). The network elements 45 may be distributed throughout the network as shown above with regard to FIG. 2. For example, in peer-to-peer file sharing networks, such a file sharing network 18 that has no centralized computer 14, but rather uses a DHT 19, the computer or network elements 45 may be distributed throughout the file sharing network. Alternatively, the network elements 45 may be merely connected with the various ISPs 24 and 26, and the internet at large 22 via connections 46.

As shown in FIG. 3, the network elements 45 may include one or more micro processors 48 connected via connections 50 to a database 52. The network elements 45 may also be operatively connected to another database 53 via connections 55. The database 53 may be searchable and may be able to provide information to the network elements 45 such as what ISP is associated with a given peer as explained in more detail later below.

In some embodiments of the invention, the network elements 45 may be already existing system components connected to the network. Existing network elements 45 may be programmed to perform the functions described herein. For example, existing networks may include network components programmed to perform the function described herein. In other embodiments, the network elements 45 may be added to the network (rather than existing network components) and configured to perform the functions described herein.

The terms peer and node are used interchangeably below. Typically the term peer refers to a physical entity (e.g., computing device) in the peer-to-peer network. Typically the term node refers to both logical (e.g., stored content) and physical entities (e.g., computing device) in the peer-to-peer network. The terms logical identities, keys and/or controlled peers typically refer to logical entries in a DHT (e.g., DHT 19).

As is known, a single physical entity or peer can join a peer-to-peer network many times with many distinct logical identities. The logical identities may have a unique identifier or key computed using, for example, a hash function. The hash function may be performed on, for example, information associated with a node and/or content. In example embodiments, a node or peer (e.g., peer 40a) may have a unique identifier or key and a file or content may have a unique identifier or key.

Known solutions for content popularity estimation rely on the statistics collected by the trackers, i.e., the central servers used in file-sharing networks. An automated tool constantly interrogates the trackers asking for the number of available seeders (peers holding a complete copy of the file) and leechers (peers holding a portion of the file) for each content item. Content items are then ranked by decreasing number of seeders and leechers, e.g., the content item with the highest number of seeders and leechers is the most popular one.

The known solutions for content popularity estimation have the following limitations: (1) they do not capture the differences in content popularity among different Internet Service Providers (ISPs), e.g., due to language differences different movies are popular at different ISPs, (2) the statistics reported may be wrong as this strategy cannot capture the "wisdom-of-the-crowds" coming from the DHT which may deviate from the estimation reported by the trackers, and (3) as tracker usage decreases over time content popularity will be soon only measurable through the aforementioned DHT.

Therefore, example embodiments insert in the DHT 19 several logical identities or controlled peers with identifiers or keys distributed throughout the DHT 19. The logical identities or controlled peers are then used to intercept the announce peer messages. Although the logical identities or controlled peers are described above as responding to announce peer messages, example embodiments are not limited thereto. The logical identities or controlled peers may also respond to, for example, route request messages, search messages and ping messages.

Figure 4A:
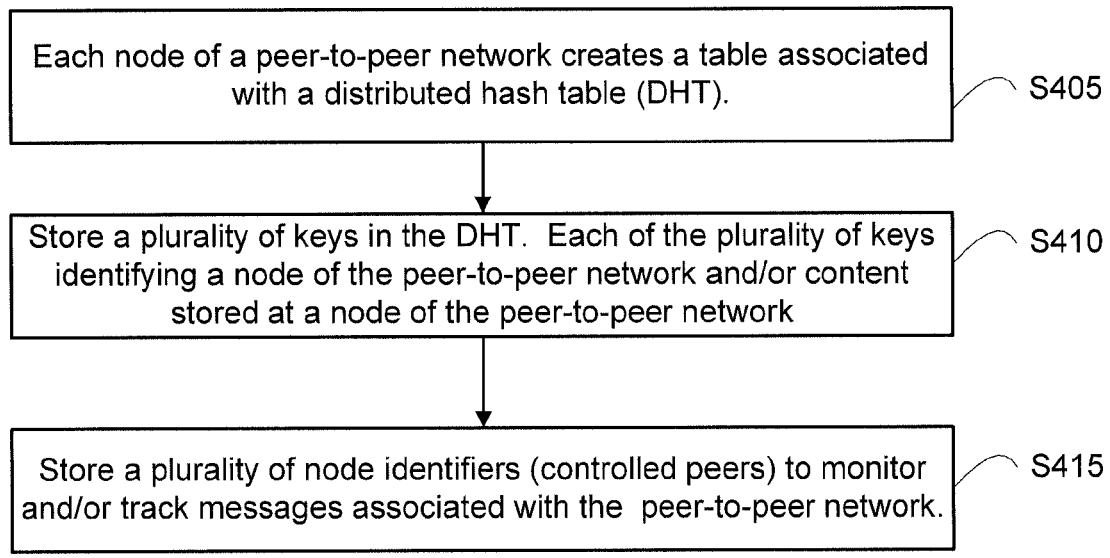
FIGS. 4A-4C illustrate a flow chart of the method for localizing a DHT according to example embodiments.
Figure 4B:
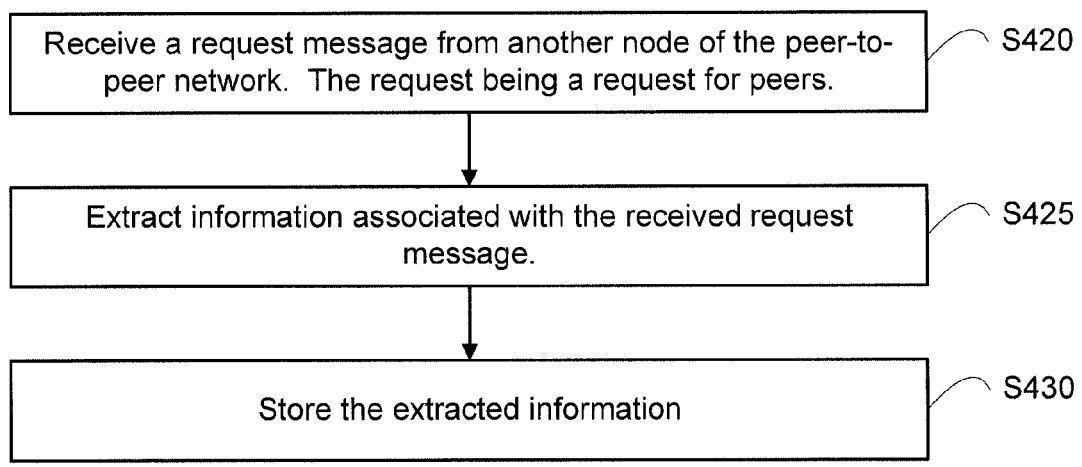
Figure 4C:
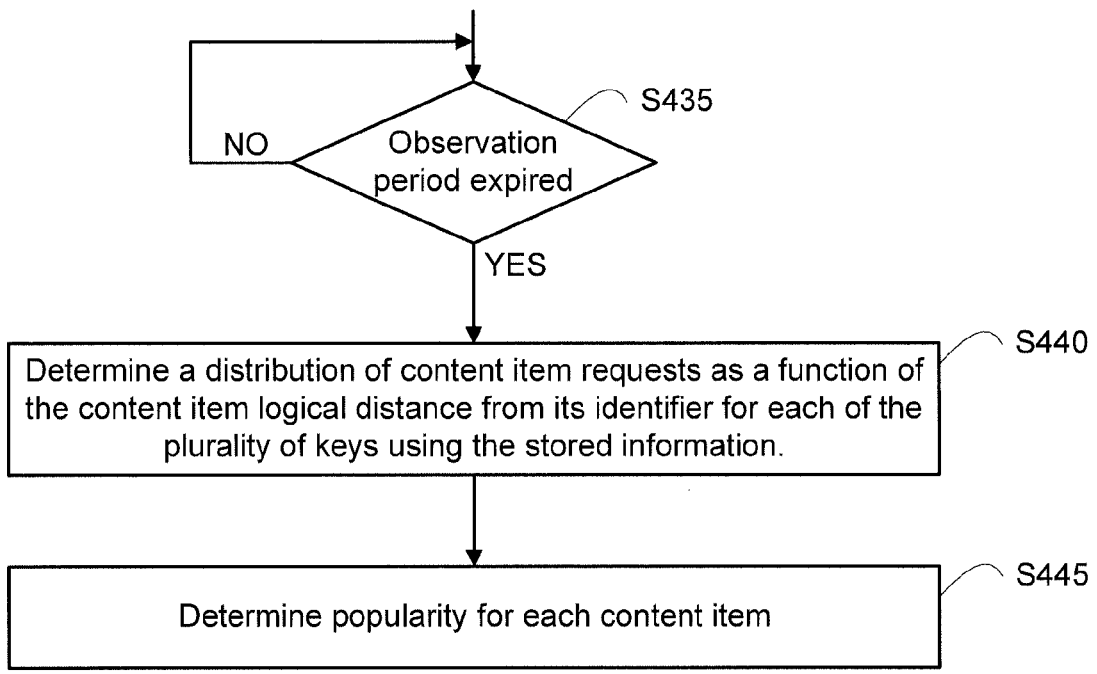
Figure 5A:
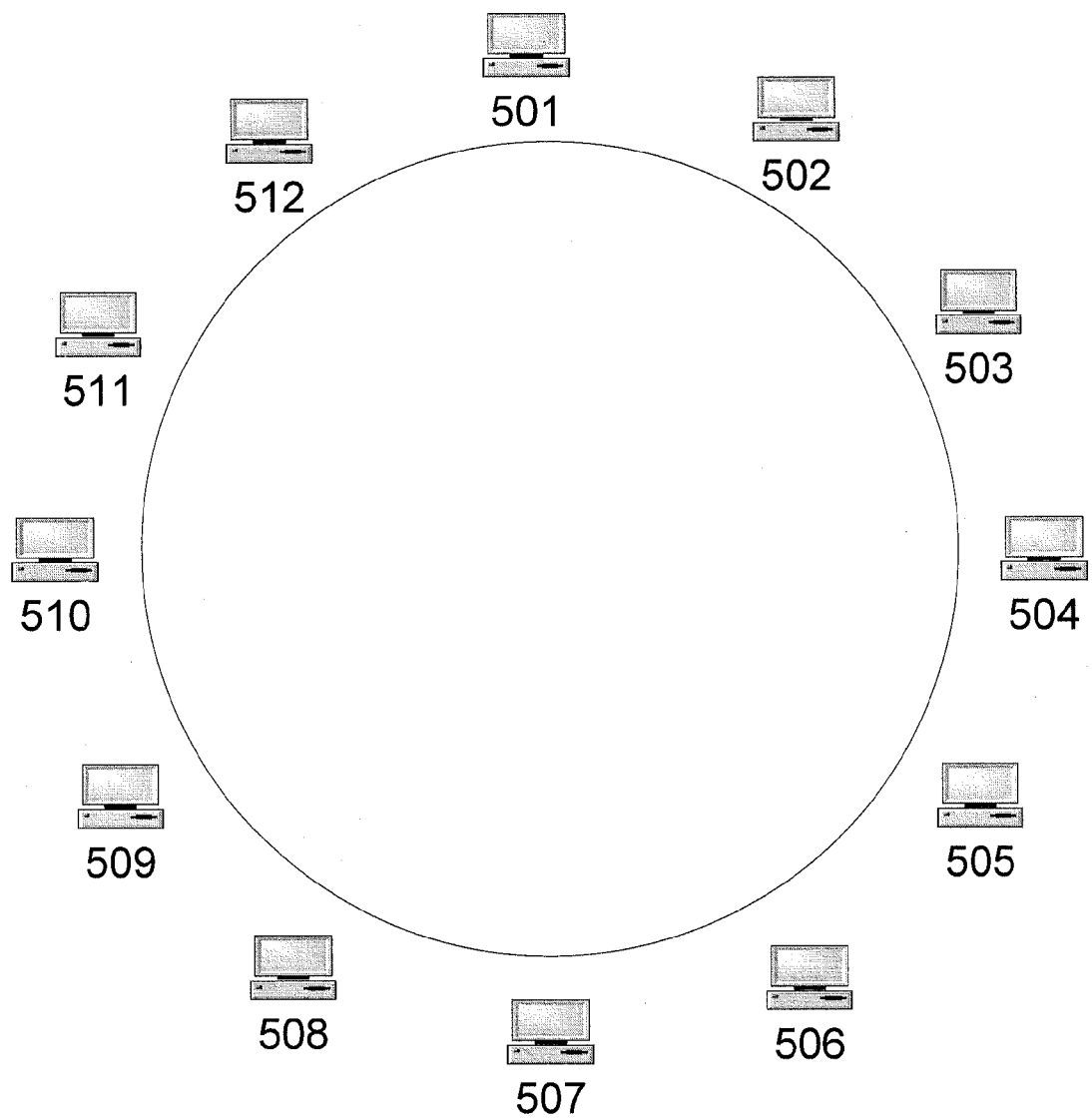
FIGS. 5A-5C graphically illustrates peers or nodes associated with a DHT including a plurality of peers according to example embodiments.
Figure 5B:
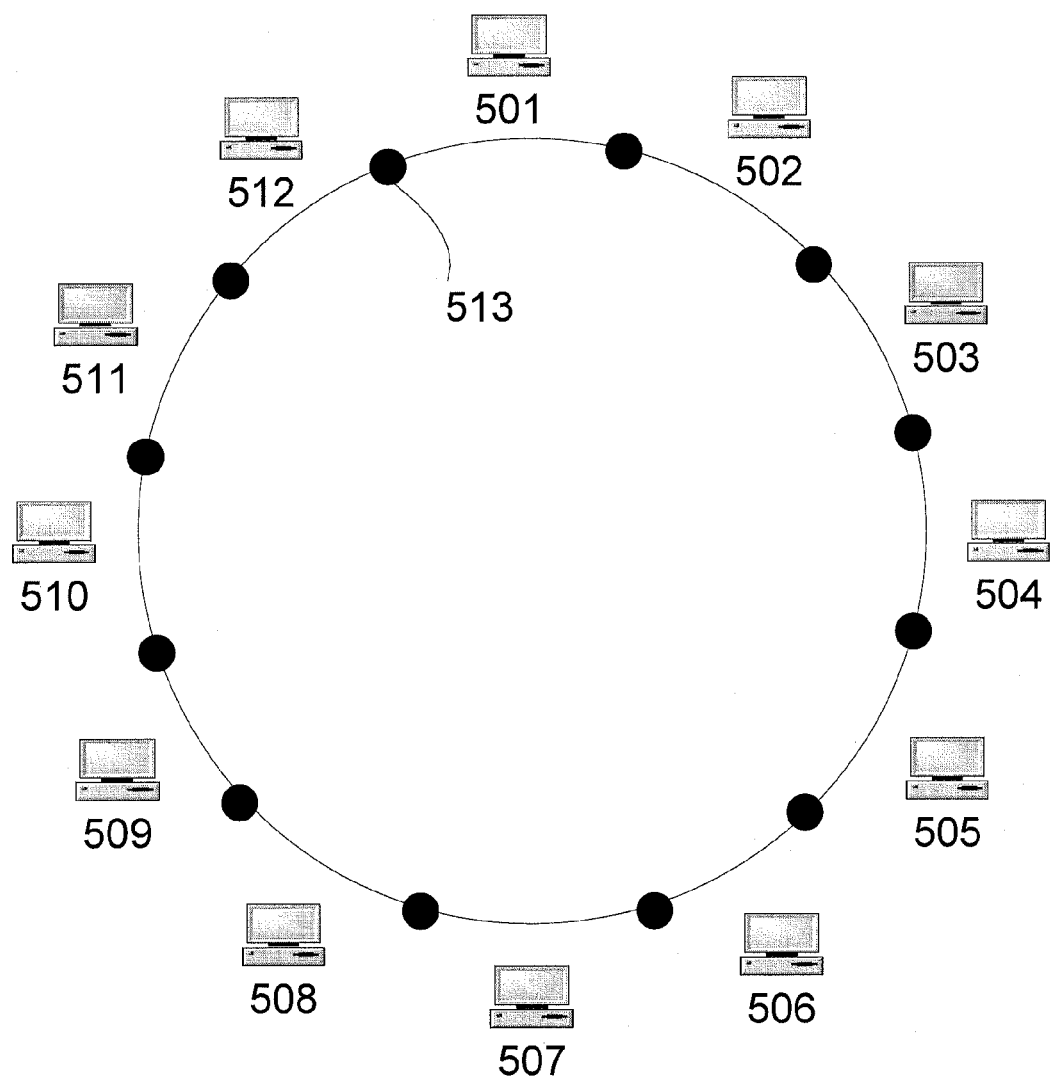
Figure 5C:
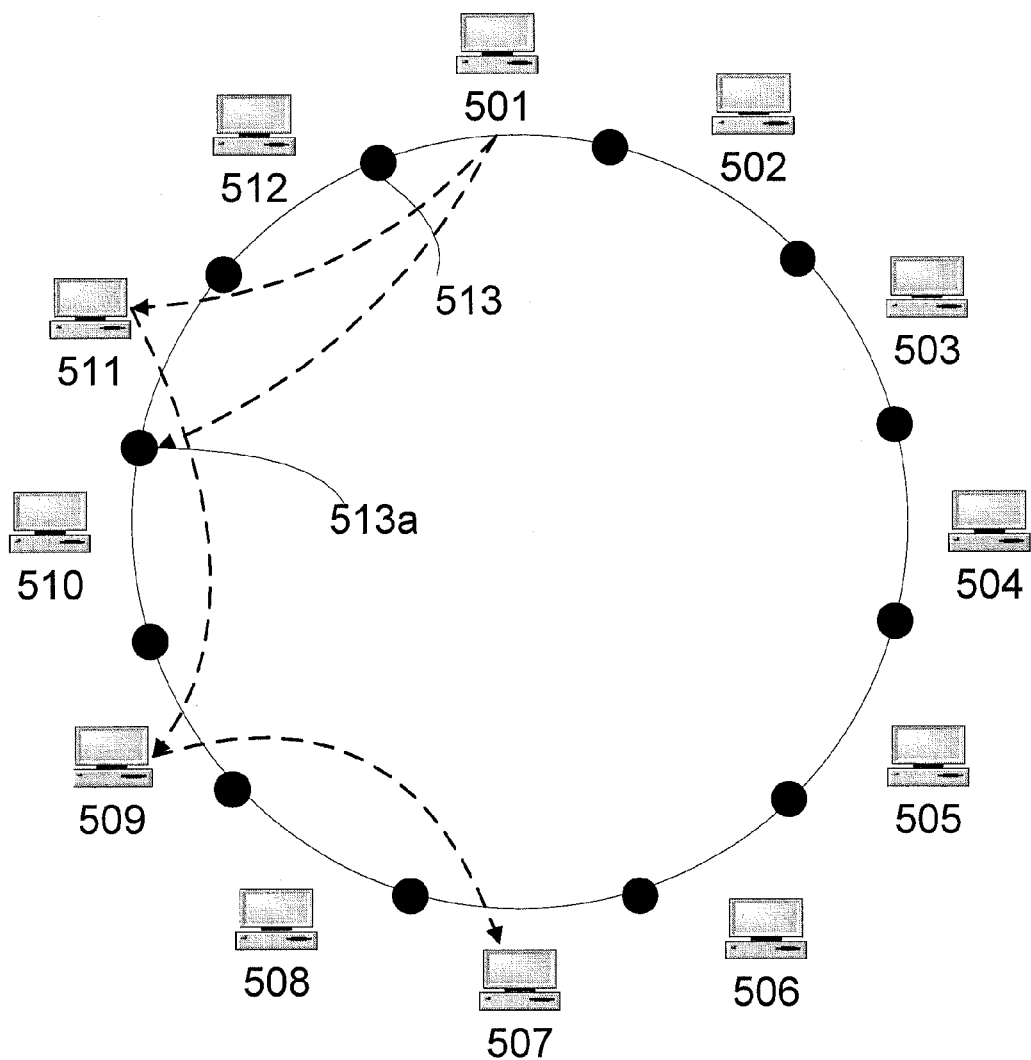

FIGS. 4A-4C illustrate flow charts of the method for content popularity extraction from a DHT according to example embodiments. While describing the steps of the method associated with FIGS. 4A-4C, reference will be made to the networks of FIG. 2 and FIG. 3. Further reference will be made to the example graphical representation of peers associated with a distributed hash table (DHT) as shown in FIG. 5A-C described in more detail below.

Referring to FIG. 4A, in step S405, a processor at each node of a peer-to-peer network (e.g., processor 48) creates a table associated with a distributed hash table (DHT) at each of the nodes of the peer-to-peer network. For example, each node 45 of file sharing network 18 may include a processor 48. The processor 48 may create a DHT 19 and store the DHT 19 in database 52.

Once the DHT 19 is created, in step S410, the DHT 19 may be populated with references to physical nodes or peers. As is known, each node or peer is added to the DHT 19 as a result of, for example, a find_nodes message or a ping message. For example, in the known file sharing system for peer-to-peer networks, BITTORRENT, a find_nodes(A) message is used where A is some information about the peer (e.g., address and port). In the BITTORRENT file sharing system, a peer wanting to join the network will send the find_node(A) message to a subset of peers in the network.

For example, a BITTORRENT file sharing system peer may have a routing table including the three closest peers. The announcing peer A may send get_peers(hash(A)) messages to the three closest peers. Each of the peers may look-up in their routing tables peers close to node identifier A. The peers return (e.g., using a message) the peers from the look-up to the announcing peer A. This lookup process may occur iteratively until the closest peers to hash(A) are found. Once the closest peers to hash(A) are found, the announcing peer A may send announce_peer(A) messages to the closest peers to hash(A).

A receiving peer may add the announcing peer to a DHT 19 associated with the receiving peer. As is known, the receiving peer may use a hash function to determine a unique identifier or key for the announcing peer. For example, the hash function may take as input, information about the announcing peer. The input information may be, for example, "A" (e.g., address and port) from the above BITTORRENT file sharing system example. The output of the hash function may be a bit sequence, key or logical identity.

As will be appreciated, there will be $2^n$ distinct outputs from the hash function. Therefore, $2^n$ entries may exist in the DHT 19 identifying $2^n$ nodes (logical or physical). As is known, because there may be a limited number of distinct nodes, it may be possible to logically separate each node by using a hash function that assigns bit sequences to each node or peer with relatively large numerical differences.

The receiving peer (e.g., node 40a) may then add the announcing peer (e.g., node 40d) to the receiving peers' DHT 19 in a <key, value> pairing, where the key is the result of the hash function (described above) and the value is some information regarding the entry in the DHT 19. For example, the value may be a node identification or name, information about the network or information about some content. The graphical representation of peers associated with a DHT as illustrated in FIG. 5A shows a DHT including only physical nodes or peers. Table 1 shows example entries in a DHT (e.g., DHT 19).

TABLE 1

| Key | Value |
| --- | --- |
| hash_a | Node_ID = computer_a |
| hash_b | node_ID = computer_b |
| hash_b1 | node_ID = computer_b, content = content_1 |

In table 1, the key (being a hashed key based on the peer, node or content) may be used as a look-up value and the value may be some information to be retrieved (e.g., content or network variables).

The receiving peer may not store information for all received announce messages. For example, as is known, the BITTORRENT file sharing system uses a DHT 19 known in the art as Kademlia. The hash function in Kademlia outputs identifiers or keys for nodes such that a bitwise exclusive or (XOR) determines a logical distance between the nodes. For example, in Kademlia, given two identifiers or keys, a and b, Kademlia defines the distance between them as their bitwise XOR distance. A Kademlia peer may only stores nodes for each of the 0<i<160 bits of its identifier or key peers having an XOR distance of $2^i<d<2^{(i+1)}$ from itself in the peers' DHT.

Returning to FIG. 4A, in step S415 the processor 48 stores a plurality of keys in the DHT 19. As is discussed above, the plurality of keys may be known as controlled peers the plurality of keys may also be known as monitors. For example, the plurality of keys may be controlled peers as shown in the graphical representation of peers associated with a DHT as illustrated in FIG. 5B. The plurality of keys or controlled peers may be uniformly distributed in the DHT 19.

For example, a plurality of keys or controlled peers may be stored in DHT 19, the keys or controlled peers may be inserted based on a known announce message. The node may store k (k being an integer value greater than equal to two) keys or controlled peers in the DHT 19. Each of the plurality of keys or controlled peers may be based on a uniform variation of the aforementioned hash function. The keys may then be entered into the DHT 19.

For example, micro-processor 48 may store the k logical identities, keys and/or controlled peers in DHT 19. Storing the k logical identities, keys and/or controlled peers in the DHT 19 may involve, for example, determining node identifications for each of the k logical identities, keys and/or controlled peers. For example, Micro-processor 48 may read an initial key, and perform logical addition or subtraction to the key to determine each of the k logical identities, keys and/or controlled peers. Alternatively, the aforementioned hash function may be executed k times with a uniformly incremented input variable. The k logical identities, keys and/or controlled peers may then be stored in the DHT 19.

Referring to FIG. 4B, in step S420, the processor 48 receives a request message from another node of the peer-to-peer network. The request being a request for peers. For example, the message may be the known announce message (as described above), a ping message and/or a route request.

In step S425, the processor 48 extracts information associated with the received request message. For example, the processor 48 may extract the identifier of the target content item and the IP address of the requesting peer. The processor 48 may use the information associated with the extracted IP address of the requesting peer to derive an ISP associated with the IP address of the requesting peer.

In step S425, the processor 48 stores the extracted information. For example, the processor 48 may store the extracted information in database 52 and/or database 53. The controlled peer constantly updates the database with the information about the number of unique peers requesting a given content item. For example, the controlled peer may update information based from each ISP associated with the peer-to-peer network.

As a result of the DHT design, the number of requests a controlled peer sees for a given content item may be a function of at least one of two parameters (1) a popularity of the content item (e.g., the number of times the content is requested) and (2) a logical distance from the controlled peer. The logical distance may be calculated using the bitwise exclusive or (XOR) method described above.

Referring to FIG. 4C, in step S435, the processor 48 determines if an observation period has expired. If the observation period has not expired, step S435 repeats. Otherwise, processing continues to step S440. The observation period should be long enough to achieve statistically meaningful information about the number of requests per content item. The observation period may be a design time choice.

In step S440, the processor 48 determines a distribution of content item requests as a function of the content item logical distance from the content items' identifier for each of the plurality of keys using the stored information. For example, the distribution of content item requests may be derived for the controlled peer assuming a uniform content popularity (e.g., each content item is equally popular). However, because the DHT protocol implementation may show that the distribution of content item requests follows a negative exponential distribution (e.g., logically close content items are frequently requested, whereas the number of requests for logically far away content items tends to zero).

As a result, content popularity may follow a Pareto distribution. In other words, the derived negative exponential distribution may differ from the empirical distribution of content item requests observed by the controlled peer or monitor. Therefore, by comparing the two distributions (e.g., using the known Kolmogorov-Smirnov methods or the known Kullback-Leibler divergence) a popularity score may be assigned to each content item.

For example, according to the Kolmogorov-Smirnov method the empirical distribution of N content items ($Y_1$, $Y_2$, ..., $Y_N$) may be defined by the following equation:

$$E_N = \frac{n(i)}{N} \qquad \text{Eq. (1)}$$

where n(i) is the number of points less than $Y_i$ and the $Y_i$ are ordered from smallest to largest value.

The Kolmogorov-Smirnov test statistic is defined by the following equation:

$$D = \max_{1 \leq i \leq N} \left( F(Y_i) - \frac{i-1}{N}, \frac{i}{N} - F(Y_i) \right) \qquad \text{Eq. (2)}$$

where F is the theoretical cumulative distribution of the distribution being tested.

As discussed above the distribution of content item requests is derived for the controlled peer assuming a uniform content popularity (e.g., each content item is equally popular). In other words, the result of Equation 1 is that each of the content items is uniformly popular. Therefore, according to Equation 2, a content item with a relatively high Kolmogorov-Smirnov test statistic (D) may be determined to be further away from the content items logical identifier. As a result, the Kolmogorov-Smirnov test statistic (D) may be used to scale popularity scores of content popularity.

The known Kullback-Leibler divergence may be similarly used to determine popularity based on the content item logical distance from the content items' identifier.

In step S445, the processor 48 determines a popularity for each content item. For example, for each content item, a popularity may be calculated based on the number of unique peers requesting a given content item as computed by each controlled peer. The popularity may be determined for the peer-to-peer network generally and/or for each ISP associated with the peer-to-peer network. The popularity may also be optionally scaled based on the content item logical distance from the content items' identifier or popularity score (e.g., the Kolmogorov-Smirnov test statistic (D)) as determined above.

Although the example embodiments above refer to ISP networks, example embodiments are not limited thereto. For example, in FIG. 5 an ISP may be replaced with any local network associated with, for example, the requesting peer or node and the nodes of the peer-set or list of nodes in the reply.

FIGS. 5A-5C graphically illustrates peers or nodes associated with a DHT (e.g., DHT 19) including a plurality of peers 501-512 according to example embodiments.

As shown in FIG. 5A the DHT (e.g., DHT 19) may include a plurality of peers 501-512. As is known, each of the peers may include a routing table (not shown). The entries in the routing table of a peer points to peers that are a various distances from the peer. A peer stores only a few references to peers that are relatively far away and increasingly more references to peers closer to the peer. For example, peer 501 may include routing table entries references to peers 502 and 512 (assuming peers 502 and 512 are relatively close) and not include a reference to peer 507 (assuming peer 507 is relatively far away).

As is known, routing to a given logical identity is done in an iterative way. The peer first consults the peers' routing table to determine one or more (typically at most three) peers closest to the logical identity. The peer sends route requests to these peers, which may or may not return to the peer route responses containing new peers even closer to the logical identity, which are queried by the peer in the next step. The routing lookup terminates when the returned peers are further away from the logical identity than the peer returning them.

For example, if peer 501 is to determine a route to peer 506 and peer 501 includes a reference to peer 503 in peer 501's routing table, peer 501 sends a route request to peer 503. Assuming peer 503 does not include a reference to peer 506 in peer 503's routing table, but peer 503 does have a reference to peer 505 in peer 503's routing table. Peer 503 sends a peer route response to peer 501 including a reference to peer 505. Peer 501 then sends a route request to peer 505, which in turn responds with a reference to peer 506 (assuming peer 505 includes a reference to peer 506 in peer 505's routing table).

Referring to FIG. 5B, the DHT (e.g., DHT 19) now includes a plurality of controlled peers 513. The controlled peers 513 may be inserted in, for example, step S415 as the plurality of keys. The controlled peers 513 may respond to route requests from several peers and so have a high probability to be included in the routing tables of real peers. For example, the number of controlled peers inserted in the peer-to-peer network may be calibrated in order to have a high probability of receiving route requests sent from real peers. According to example embodiments, when the controlled peers receive a route request they generate the most accurate response by including only peers from the ISP of the originated peer.

Although the controlled peers 513 are described above as responding to route requests, example embodiments are not limited thereto. The controlled peers 513 may also respond to, for example, announce peer messages, search messages and ping messages.

Referring to FIG. 5C, a search operation according to example embodiments is performed by peer 501 from within a DHT (e.g., DHT 19). The dotted arrows represent the hops followed by a route request initiated by peer 501 to locate content or a content item. As is shown in FIG. 5C one set of request is forwarded from node 511 to node 509 to node 507. Node 507 presumably includes the requested content item. Therefore, node 507 is the last hop. In addition, a second route request terminates at controlled peer 513*a*.

For example, as described above, one well known file sharing system for peer-to-peer networks is known as BIT-TORRENT. The BITTORRENT file sharing system uses the get_peer object to make a content request. A peer sends get_peer messages to the k peers whose node identifications the peer is already aware of (e.g., stored in a DHT associated with the peer making the request). Although a get_peer message is described, alternative messages may also be used. For example, the known get_route message may be used. The get_route message is used to determine the hops from one node to another.

As is known, peers in a BITIORRENT file sharing system respond with messages of other known peers. For example, if the responding peer does not know of any peers including the content, the responding peer replies with a list of known peers that the requesting peer may send a message to in a next iteration, peers which identifiers are closer to the identifier of the requested file. As is known, this iterative process repeats until the get_peer message is replied to with a list of peers that hold a copy or a portion of the requested content. The list of peers may include, for example an address of the peer and a port number to access the content through.

As is shown in FIG. 5C, controlled peer 513*a* receives or intercept the get_peer message. As described above, in, for example, steps S425 and S430, information may be extracted from the get_peer message and stored in a memory (e.g., database 52).

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

In addition, the information stored in relation to the logical identities and/or controlled peers may include references to networks (e.g., ISPs) associated with node information stored in the DHT (or elsewhere). Response messages to requests for content, therefore, may only include lists of nodes or peer-sets that are associated with a same network as a sender of the request for content.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method, comprising:
   receiving, by a first node, at least one request message from at least one second node of a peer-to-peer network;
   determining, by the first node, information associated with the at least one request message, the information indicating a content item and at least one internet service provider (ISP) associated with the at least one second node, the at least one ISP is associated with the peer to peer network;
   determining, by the first node, a content popularity of the content item for the at least one ISP based on at least a logical distance of the content item from an associated identifier and a number of distinct nodes requesting the content item; and
   providing the content item to a requesting node based on the content popularity.

2. The method of claim 1, wherein
   the first node includes a table, the table storing a plurality of keys and node information, the node information being stored in relation to each of the plurality of keys,
   the table is associated with a distributed hash table,
   the plurality of keys represent a plurality of controlled peers associated with the peer-to-peer network,
   the controlled peers are logical entries in the distributed hash table, and
   the request message includes an address associated with one of the controlled peers.

3. The method of claim 2, wherein the controlled peers are uniformly distributed throughout the distributed hash table.

4. The method of claim 1, wherein the logical distance is calculated based on at least one of a bitwise exclusive function, a logical identifier of the first node and a logical identifier of the content.

5. The method of claim 1, wherein
the logical distance is indicated by a score, and
the content popularity of the content item is scaled by the score.

6. A node of a peer-to-peer network, the node comprising:
a memory configured to store a table, the table including a plurality of keys and node information, the node information being stored in relation to each of the plurality of keys; and
a processor configured to,
   receive at least one request message from at least one second node of the peer-to-peer network based on an address associated with one of the plurality of keys,
   determine information associated with the at least one request message, the information indicating a content item and at least one internet service provider (ISP) associated with the at least one second node, the at least one ISP is associated with the peer to peer network;
   determine a content popularity of the content item for the at least one ISP based on at least a logical distance of the content item from an associated identifier and a number of distinct nodes requesting the content item, and
   provide the content item to a requesting node based on the content popularity.

7. The node of claim 6, wherein
the table is associated with a distributed hash table,
the plurality of keys represent a plurality of controlled peers associated with the peer-to-peer network, and
the controlled peers are logical entries in the distributed hash table.

8. The node of claim 7, wherein the controlled peers are uniformly distributed throughout the distributed hash table.

9. The node of claim 6, wherein the logical distance is calculated based on at least one of a bitwise exclusive function, a logical identifier of the first node and a logical identifier of the content.

10. The node of claim 6, wherein
the logical distance is indicated by a score, and
the content popularity of the content item is scaled by the score.

* * * * *